United States Patent

[11] 3,576,343

[72] Inventors Sven-Eric Juhlin
 Gustavsberg;
 Henrik Carl Wilhelm Wahlforss,
 Stockholm, Sweden
[21] Appl. No. 853,283
[22] Filed Aug. 27, 1969
[45] Patented Apr. 27, 1971
[73] Assignee A. B. Gustavsbergs Fabriker
 Gustavsberg, Sweden
[32] Priority Aug. 30, 1968
[33] Sweden
[31] 11,686/68

[54] GRIPPING TONGS
 3 Claims, 2 Drawing Figs.
[52] U.S. Cl. .................................... 294/100,
 294/116
[51] Int. Cl. ..................................... B25b 3/00
[50] Field of Search .......................... 294/100,
 99, 86.21, 86.32, 115, 19; 81/3.35, 43; 3/12.7

[56] References Cited
UNITED STATES PATENTS
2,931,680 4/1960 Kaspaul ........................ 294/100
3,093,402 6/1963 Sisson ........................... 294/100

Primary Examiner—Evon C. Blunk
Assistant Examiner—Johnny D. Cherry
Attorney—Pierce, Scheffler and Parker ABSTRACT: Tongs having a gripping member provided with jaw members so adapted that when the tongs are manipulated by drawing the gripping members into a chuck they are moved together to grip the object selected. Said gripping member is mounted on a journal in an axial bore in the chuck and the shape of the forward portion of the bore is such that when the journal is moved into this portion of the bore, the gripping member is able to turn about its center axis. The rear end of said bore is provided with locking means which prevent turning of the gripping member when the journal is moved into the rear, inner portion of said bore.

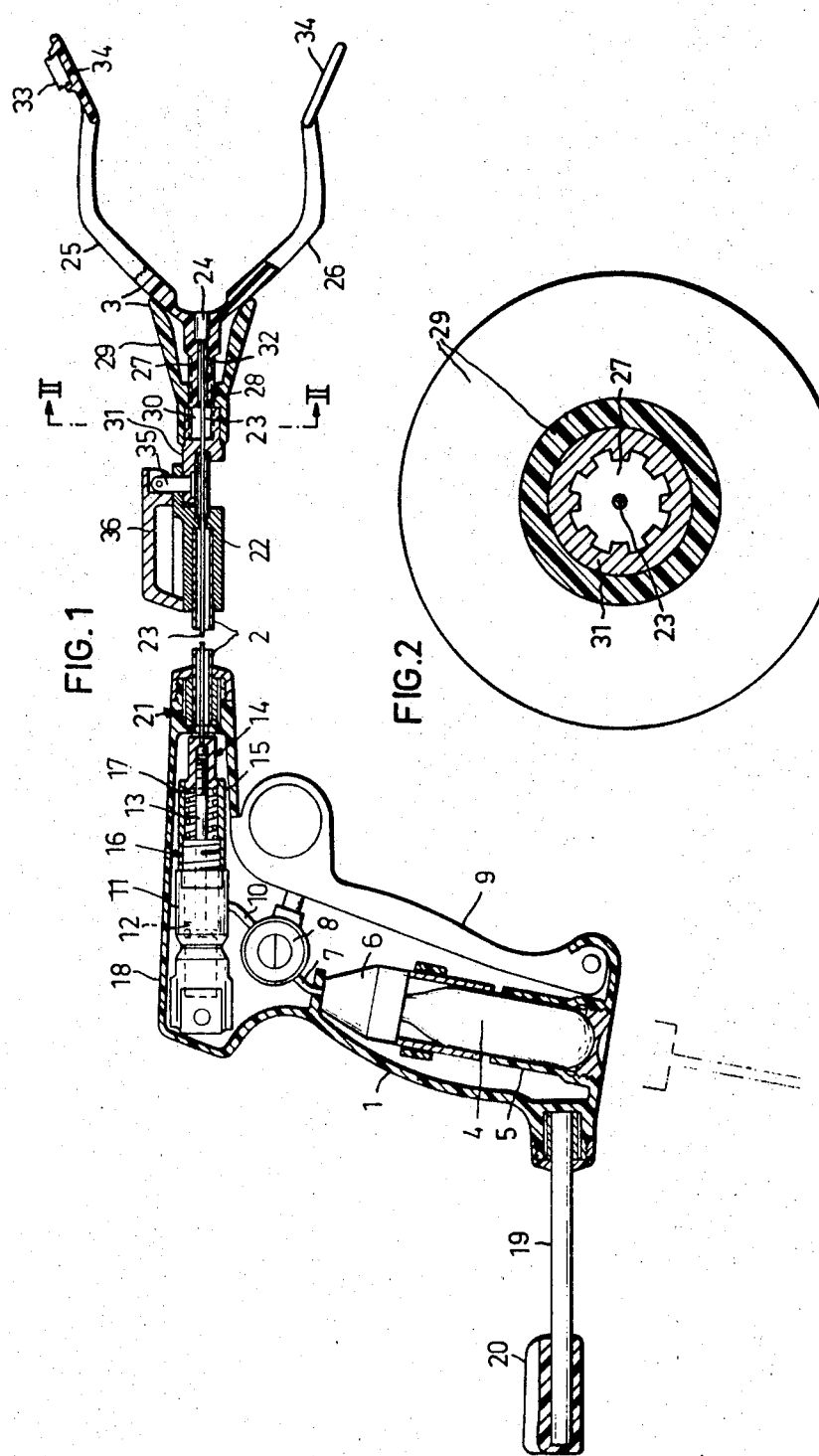

GRIPPING TONGS

The present invention relates to tongs having a gripping member provided with jaws arranged to be moved towards each other when the tongs are manipulated by drawing the gripping member into a conical chuck, thereby enabling an object to be gripped. The tongs are particularly intended for use by disabled persons, that is persons whose movements are restricted. To these ends the tongs have incorporated therein a power source from which power can be released by the operator in order to manipulate the tongs.

The invention is mainly characterized in that the gripping member is journaled on an axially situated journal in an axial bore in the chuck, the front portion of the bore being of such construction that when the journal is inserted in this portion of the bore, the gripping member is able to turn, and wherein the rear portion of the bore is provided with a locking means which prevents turning of the gripping member when the journal is inserted in the rear portion of the bore.

A preferred embodiment of the invention will now be described with reference to the accompanying drawing, in which:

FIG. 1 shows in side view and partly in section a shortened embodiment of the tongs according to the invention; and FIG. 2 shows in an enlarged transverse vertical section of the tongs as seen from the line II–II of FIG. 1.

The main parts of the tongs comprise an operating handle 1, a shaft 2 extending from the handle, and a gripping member 3 attached to the outer end of the shaft. The power source is located inside the handle 1 and comprises a tube 4 filled with carbon dioxide at a pressure of 60 gauge pressure. The tube is mounted in a holder 5 and inserted in a valve seating 6 which lifts the valve incorporated in the tube. A thin pipe 7 passes from the valve seating 6 to a reduction valve 8 which also serves as an operating valve and is manipulated by an operating trigger 9 rotatably mounted on the handle 1. A thin pipe 10 passes from the reduction valve 8 to a servocylinder 11 in which a piston 12 is connected via a rod 13 with a wire attachment means 14 which can be displaced in a cylindrical extension 15 of the servocylinder 11 which is ended towards the servocylinder by a stationary cylinder 16, through which the piston rod 13 extends. Located in the cylindrical extension 15 is a pressure spring 17, the one end of which lies against the wire attachment means 14, while the other end bears against stationary cylinder 16. The spring 17 returns the servopiston 12 and the attachment means 14 to starting position when the tongs are opened. The servocylinder 11 is incorporated in a portion 18 of the handle 1 which extends from the actual handle at an angle somewhat greater than 90. Mounted at the lower end of the handle is a rod 19, the outer end of which carries a plate 20 which is intended to be supported against the forearm so as to relieve the wrist.

The portion of the handle in front of the attachment means 14 is constructed to form an attachment 21 for the shaft 2 which has been shortened in the drawing. The shaft 2 is a plastic coated metal tube secured at its outer end in an attachment 22 which is pivotally connected with the gripping means 3 of the tongs. A wire 23 passes through the shaft 2, from the attachment means 14 in the handle to a wire attachment means 24 in the gripping member.

The gripping member 3 has two jaw members 25 and 26 and is suitably made of a flexible, resilient plastic material to enable the jaws to be urged towards each other under the influence of force and when the force is relieved spring back to starting position. The jaws 25, 26 are mounted in one end of a cylindrical journal 27 which is provided externally thereof with key members. The journal 27 extends through a cylindrical bore 28 in a chuck 29 which widens outwardly in a direction towards the jaws. The internal diameter of the bore 28 corresponds to the external diameter of the keys, whereby the journal 27 can be freely rotated in the bore 28. The bore 28 is continued rearwardly by an axial hole 30 in a locking means 31 connected with the chuck 29. The hole 30 in the locking member 31 is provided with internal, longitudinally extending keyways shaped to correspond to the keys on the journal 27. The journal 27 is also provided with an axially throughpassing hole 32 through which the wire 23 is passed to its attachment means 24. When pulling the wire towards the handle, the portion of the journal 27 carrying the keys is moved into the grooved hole 30 of the locking piece 31, whereby the journal and tong jaws are locked against rotation about their center axis. At the same time the inner portions of the jaws are drawn into the chuck 29 and urged towards each other to enable an object to be gripped and held fast. When the pull on the wire is released, the resiliency of the jaws causes them to be ejected from the shuck, whereupon the journal slides out of the hole 30 in the locking piece and is free to rotate about its center axis. A magnet 33 is attached to the end of one jaw member 25 to enable objects made of iron to be held. The ends of the jaw members 25 and 26 are also provided with angled pickup members 34.

The locking piece 31 is provided at the rear end thereof with a pivot connection 35 on the shaft attachment means 22, and a locking arm 36 is arranged to lock the pivot in selected angular positions.

In accordance with the invention, the tongs are thereby adapted so that the gripping member 3 when not actuated is free to rotate about its center axis, thereby permitting the gripping member to be adjusted to any desired position about its center axis. When the tongs are operated by releasing carbon dioxide into the servocylinder, the gripping member is caused to grip and hold the selected object, the gripping member being locked against rotation about the center axis, thereby enabling the gripped object to be held in a selected position.

We claim:

1. Tongs having a gripping member provided with jaw members so adapted that when the tongs are manipulated by drawing the gripping member into a conical chuck, they are moved together to grip the object selected, characterized in that the gripping member is mounted on the journal in an axial bore in the chuck and wherein the shape of the forward portion of the bore is such that when the journal is moved into this portion of the bore, the gripping member is able to turn about its center axis, and wherein the rear end of the bore is provided with locking means which prevent turning of the gripping member when the journal is moved into the rear, inner portion of said bore.

2. The tongs of claim 1, characterized in that the locking means comprises interengaging keying means arranged on the journal and in the rear end of the bore.

3. The tongs of claim 2, characterized in that the forward end of the bore has an internal diameter which corresponds to the external diameter of the keying means of the journal.